United States Patent [19]
Lorphelin

[11] Patent Number: 5,870,726
[45] Date of Patent: Feb. 9, 1999

[54] PROTECTED SOFTWARE RENTAL USING SMART CARDS

[76] Inventor: Vincent Lorphelin, 5, rue Denis Poisson, F 75017 Paris, France

[21] Appl. No.: 737,516
[22] PCT Filed: May 24, 1995
[86] PCT No.: PCT/FR95/00680
  § 371 Date: Nov. 12, 1996
  § 102(e) Date: Nov. 12, 1996
[87] PCT Pub. No.: WO95/32479
  PCT Pub. Date: Nov. 30, 1995

[30] Foreign Application Priority Data

May 25, 1994 [FR] France .................................. 94 06328

[51] Int. Cl.⁶ ...................................................... G06F 17/60
[52] U.S. Cl. ............................................................. 705/400
[58] Field of Search ............................................. 705/400

[56] References Cited

U.S. PATENT DOCUMENTS

| | | | |
|---|---|---|---|
| 4,683,553 | 7/1987 | Mollier | 380/4 |
| 4,796,181 | 1/1989 | Wiedemer | 380/4 |
| 5,047,928 | 9/1991 | Wiedemer | 380/4 |
| 5,083,309 | 1/1992 | Beysson | 380/4 |
| 5,155,680 | 10/1992 | Wiedemer | 380/4 |
| 5,327,497 | 7/1994 | Mooney et al. | 380/25 |
| 5,386,369 | 1/1995 | Christiano | 705/400 |
| 5,689,560 | 11/1997 | Cooper et al. | 380/4 |
| 5,761,651 | 6/1998 | Hasebe et al. | 705/400 |

FOREIGN PATENT DOCUMENTS

| | | |
|---|---|---|
| 0 089 876 | 9/1983 | European Pat. Off. . |
| 0 265 183 | 4/1988 | European Pat. Off. . |
| 0 430 734 | 6/1991 | European Pat. Off. . |
| 85/02696 | 6/1985 | WIPO . |
| 93/24906 | 12/1993 | WIPO . |

OTHER PUBLICATIONS

S. Tashiro, et al.,; "Implementation of a Small–Scale Protype for Software Service System (SSS)", Systems and Computers in Japan, Vol. 19, No. 5 (1988), pp. 50–61.

Primary Examiner—Edward R. Cosimano
Attorney, Agent, or Firm—Staas & Halsey

[57] ABSTRACT

System comprising a central processing unit and a dedicated unit. Said dedicated unit receives a communication protection module which controls a sequence controlling module containing a state machine and a cycle counter, a timing module activated by said sequence controlling module and a software protection module also activatable by said sequence controlling module.

15 Claims, 3 Drawing Sheets

PROTECTED SOFTWARE RENTAL USING SMART CARDS

BACKGROUND OF THE INVENTION

The present invention relates to the renting ot computerized means (software and/or hardware) in accordance with a schedule which depends on the actual use of this facility.

This schedule can be compiled on the basis of various measures such as the period for which a piece of software is made available, the duration of use of this piece of software, the number of transactions made or dossiers created, the number and quality (difficulty or rarity) of calculations, the number and quality of files consulted, especially, and more generally of any computing or remote-computing service made available to a user, and the operation of which is enabled at least in part by the said software.

A fair number of proposals have already been made for providing protection for the supplier (or designer) of a piece of software, especially: EP-A-0,430,734; IEICE transactions, vol. E 73, No. 7, July 1990, JP, pp 1133–1146; EP-A-0,265,183.

Thus, the concept is known of a computerized device, of the type including:

an operational facility, comprising at least one central processing unit, together with memory means allowing it to load an operating system and to implement at least one piece of software on the basis of this operating system, and together with at least one connection interface which can be accessed through a function of the operating system, and a dedicated unit including a removable memory medium reader, such as a smart-card reader, connected to the central processing unit by the said connection interface of the latter, while the software includes specific calls to the dedicated unit, for the purposes of conditioning the conduct of the execution of the said software, depending on the state of certain data contained in the removable memory medium.

This is done in EP-A-0 430 734, with the intention of the software sending results to the smart card which it will have to be able to retrieve therefrom subsequently, failing which the software cannot be fully executed.

These known solutions are not entirely satisfactory from the security standpoint, it being observed that a perfect security system is inconceivable.

SUMMARY OF THE INVENTION

The invention is therefore aimed firstly at improving security as regards protecting a piece of software against unauthorized use.

The invention is aimed, more precisely, at improving this security sufficiently for it to be possible for example to rely on it for pricing the charges for renting the software, as will be seen later.

The object of the invention is also to provide a solution which is applicable for several renters, several pieces of software and several possible simultaneous lessors.

The Applicant has observed that the difficulties of implementation originate from the manner in which the rental and protection processes are associated.

The invention stems from a computerized device of the aforesaid type.

According to one aspect of the invention the specific calls are configured in the form of communication commands, possessing send arguments, and whose completion state is suspended while awaiting a response of particular form, and the removable unit comprises:

a communication security module capable of disabling the response to a communication command originating from the central processing unit, depending on first conditions involving the expression of the communication command, and information contained in the card, and at least one responsive module capable of recognizing such a communication command and of according it a favourable response, in the said particular form, only if second conditions pertaining to the arguments of the said command and to information contained in the card are complied with.

The responsive module can be a usage metering module, such as an electronic purse and/or a time metering module.

Provision may then be made for the said response of particular form to include a first state, affording authorization of normal operation of the software, and a second state, affording authorization of operation at the very most only in downgraded mode (reduced capabilities).

BRIEF DESCRIPTION OF THE DRAWINGS

Other characteristics and advantages of the invention will emerge on examining the detailed description below, and the attached drawings in which.

DESCRIPTION OF THE PREFERRED EMBODIMENT

Being elements pertinent to security, it will be understood that certain parts of the device are described only as regards their principle.

Before describing the invention in detail, it is useful to recall all of the known solutions.

Certain rental processes are based on the number of transactions counted between a remote unit (placed under the control of the supplier) and local units; other rental charges are based on the time spent by the remote unit in processing these transactions. In both cases, accounting is performed by the remote unit.

In parallel with this, processes have been proposed which use electronic boxes which perform the decrementation of a counter on command from the leased software. These boxes are in general connected to a communication port of the computer. Depending on the variant, reincrementation of the counter is effected by inputting at the keyboard a code forwarded by the lessor, or via a link with a central computer. In all these cases, since the protection is either software-based or based on passive technology (ROM, epROM, eepROM or e2pROM), it does not offer a level sufficient for rental.

Other processes propose an electronic box incorporating a microprocessor. As these boxes, although removable, are not designed to be frequently connected and disconnected from the system, implementation is incompatible with the commercial constraints as soon as this system is associated either with several pieces of software, or with several renters.

Microchip (microprocessor or so-called hard-wired computational logic) card systems have also been proposed which contain a counter which is decremented on the basis of the time measured between two successive commands of the software; these commands normally intervene at known time intervals. Implementation of this process requires incorporating a timing interrupt command when this time is uncertain. Now, this interrupt command considerably weakens the level of security accorded by the microchip card.

Still other solutions invoke the means of incorporating, into the process, a module for protecting the leased software and a counter which is decremented in line with use; when this counter runs out, the protection module is disabled, thus causing the software to lock up. Now, in most cases, it is desirable for the software to continue to operate, with reduced capabilities (down-graded mode), nevertheless remaining protected against fraudulent use.

None of this, therefore, is really satisfactory.

Figure 1:
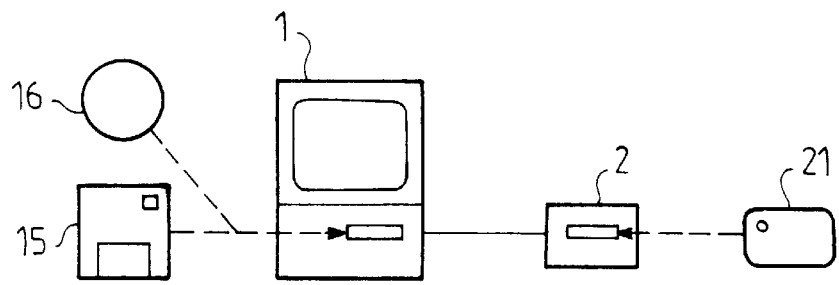
FIGS. 1, 1A and 1B are the general diagrams of three examples of installations in which the invention can be implemented.

The invention stems from a computerized facility which includes, in FIG. 1, at least one central processing unit 1, to which is adjoined a dedicated unit 2. These two units can communicate with each other, via an appropriate interface, which may be a port of the central processing unit, for example the serial port of a microcomputer, or again a connector of a peripheral controller mounted on an internal card, or on the mother card.

The central processing unit 1 is made up of computer hardware and/or software and/or files, at least a part of which is delivered either on a portable mass memory of the diskette 15, or compact disc 16 kind, or as permanent (epROM) or backed-up memory. This "delivered part" may comprise executable files (such as programs) or non-executable files (such as databases, or other data files, including audio and/or video, for example).

Figure 1A:
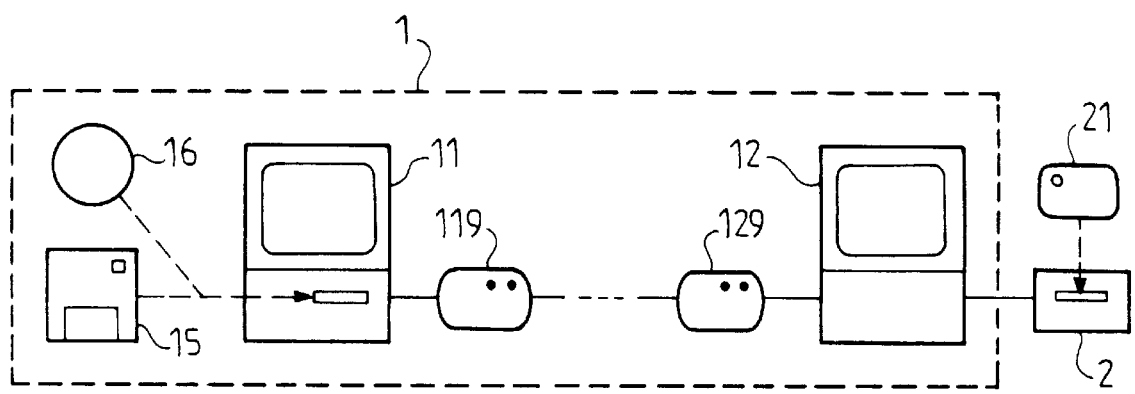

As a variant (FIG. 1A), a local central processing unit 12 is connected by modems (or some other link) 129 and 119 to a remote or supplier central processing unit 11 which, in this case, contains, on internal or external mass memory, part at least of the useful software and/or files. It is in principle necessary for a—small—part of the software to reside in the local station. In this instance these will be the minimal user interface functions for presenting the results of the service to the user, and the minimal functions (debit) to be executed on the smart card.

Figure 1B:
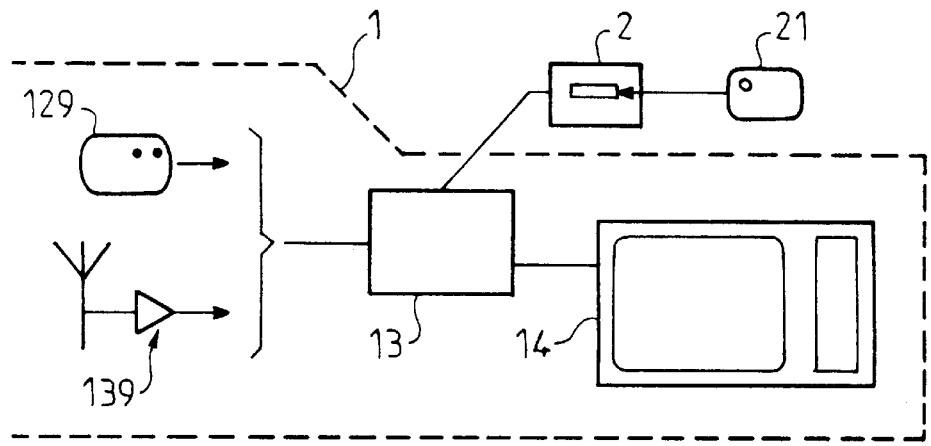

According to another variant (FIG. 1B), a wire transmission arrives at the modem 129, or else a radio transmission arrives at the reception facility 139. The local part of the computerized facility can then be based on a microcomputer station, as before, or else, as represented, on a unit 13 (games console for example) which cooperates with the monitor part of a television receiver 14.

In these three modes, which are non-limiting examples, the local unit 1, 12 or 13 is linked to the dedicated unit 2.

In what follows, the case of FIG. 1 will be adopted for simplicity. It will also be assumed that the dedicated unit 2 is linked to a serial port of the central processing unit 1 (although other links, especially to a PCMCIA port could be envisaged).

The operating system of the local processing unit 1 supplies a function or primitive for access to the serial port concerned.

The software to be executed includes calls to this access primitive, so as to be able to access the interior of the smart card 21.

According to one aspect of the invention, these so-called "specific" calls are configured in the form of communication commands, having send arguments, and awaiting a response of particular form. The send arguments are for example an identifier and a code respectively. The completion state of the specific call is suspended while awaiting the said response of particular form, which will condition the manner in which the execution of the software will be conducted. Of course, this suspension can be bounded by a maximum waiting time, at the end of which a negative response is presumed.

Thus, in other words, the local processing unit can execute commands for communication with the dedicated unit 2, the results of which authorize or disable normal or downgraded execution of this local processing unit 1.

For most applications, one of these commands will be of the "DECREMENT" type. It can be produced directly or else implicitly in association with another command.

Very generally, the dedicated unit 2 is made up of at least one removable part termed the card, for example a smart card 21, and of a card reader. Incorporated therein are modules which include processing means capable in particular of formulating the results of communication, on the basis of their own defined information stored or calculated beforehand.

The card 21 includes at least one communication security module 6 whose role is to make secure the exchanges of information between the central processing and dedicated units. As illustrated in the drawing by switchovers 251, this module 6 is able to intercept, in one and/or the opposite direction, part at least of the communications between the local processing unit 1 and the card 21, over the lines 203 to 207. This can be done by various kinds of control checks exercised on the flowing datastream. For example, the data of the stream can be enciphered or signed with the aid of a key which can be determined from the information contained in the memory (not represented) of the card 21. Any error of encipherment, respectively of signature, translates into the intercepting of the datastream placed under the control of the module 6. An error response destined for the central processing unit 1 is preferably appended thereto.

Thus, the module 6 exercises access control on one or more other so-called "responsive" modules, among which has been represented a usage counter 3, a time metering module 4 and a sequence control module 5.

Figure 2:
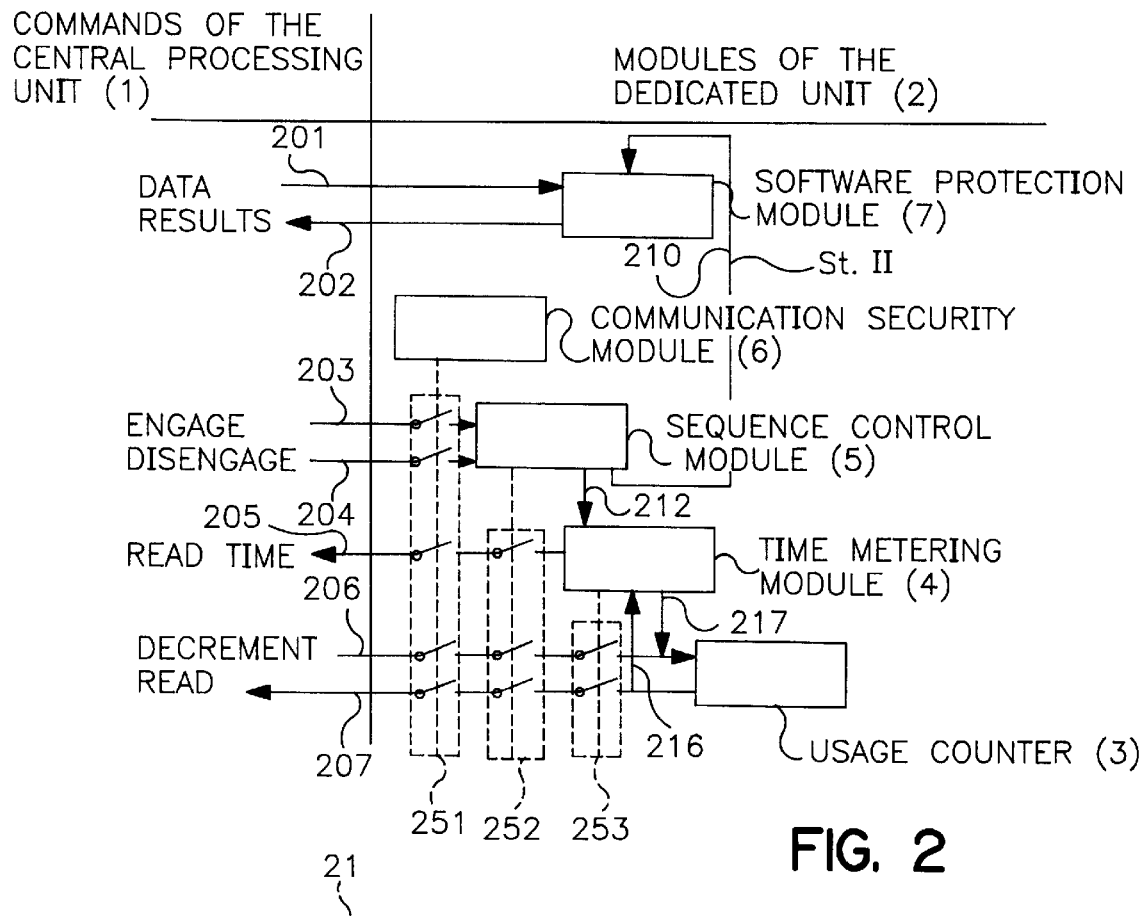
FIGS. 2, 2A illustrate diagrammatically the "removable medium" part of the implementation of the invention.

More generally, this signifies that a hierarchy can be established in the "responsive" modules. A responsive module of higher priority can then intercept the commands addressed to other responsive modules of lower priority. The establishing of this hierarchy will depend on the applications, the illustration in FIG. 2 being merely an example of this.

Thus depicted, the proposed device offers a cascade of modules, each of which conditions access to those which follow (of lesser priority), down to the lowest priority level, which contains in particular the accounting functions related to the renting of the software (to which may be added other conditions), and ultimately conditions the conduct of the operations of this software.

On delivery the usage counter 3 contains a software use credit which can be read and/or decremented by the software in line with its use, under the control of the communication security module 6 and, as the case may be, of the sequence control module 5. Preferably, every decrementation operation is accompanied by a reading of the new value of the credit.

It may be beneficial to make provision for a command to be interpreted by the card as the combination of this command and another, implicit command. For example, a DATA command (201) can implicitly generate, in the card, a DECREMENT command.

In a particular embodiment, use is made of the sequence of states of the sequence control module 5. Changes of states are due to corresponding commands originating from the central processing unit 1, under the control of the communication security module 6, and/or to internal events in the card.

Figure 3:
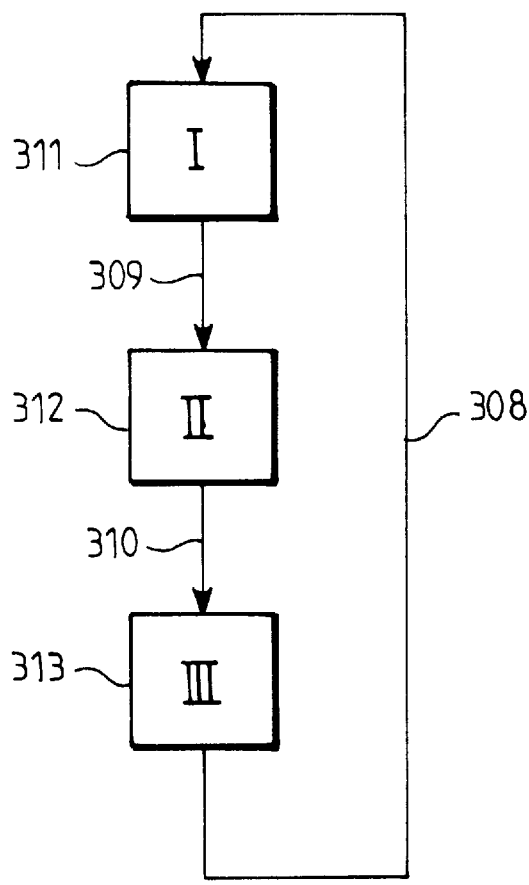
FIGS. 3 and 3A illustrate diagrammatically two versions of a handler used in one embodiment of the invention.
Figure 3A:
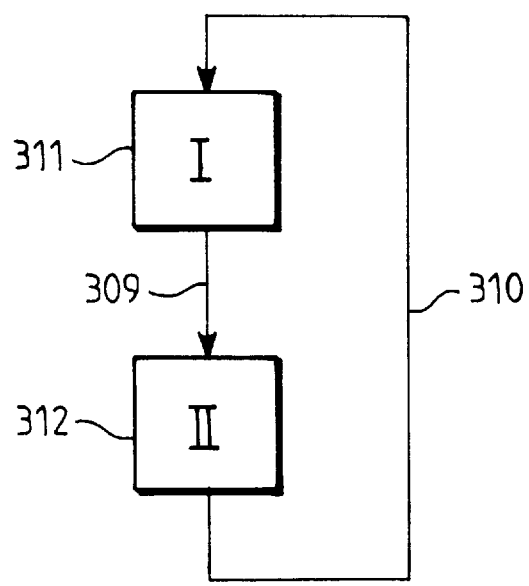

FIG. 3 and FIG. 3A are illustrations of a handler and the states thereof. Two states at least are necessary (states I and II). However, as the card is removable, and hence can be inserted and withdrawn, the sequence proposed according to the invention is as follows:

insertion 308: transfer to state I (311)

engagement 309: transfer to state II (312)

disengagement 310: transfer to state III (313)

withdrawal 308 and await insertion.

The card can be withdrawn and reinserted in the course of each of the states I (311) and II (312) without affecting this sequence. This presupposes that the handler of the module 5 is constructed in eepROM memory.

This sequence is intended, in particular, to oblige a fraudster to withdraw and reinsert the smart card into the reader with each engage/disengage simulation of the metering module, thus considerably slowing down the operations and making his task laborious.

Stated otherwise, the above is a looped handler with two (FIG. 3A), or preferably three states (FIG. 3) at least, with which are associated two, respectively three transitions. Entry into a state is permitted only in the presence of the transition associated with this state.

One of the transitions is the withdrawal/reinsertion of the card. A second transition is produced in the presence of one at least of the commands (at most, all of them, except, as the case may be, the disengage command) coming from the local processing unit 1, and/or upon an internal event in the card (and emanating from one of the other modules). The third transition is produced either in response to a disengage command, or likewise upon an internal event in the card, such as the exceeding of a maximum period during which the card has received no command.

The intermediate state II (awaiting "disengage") then serves as the basis for enabling certain functions in the card, such as time metering, which in turn conditions usage metering, or else command, and also control of the protection of the software, about which more will be said later.

As indicated by FIG. 3A, it is possible, for certain applications, to restrict the handler to two states, and the two transitions termed "engagement" 309 and "disengagement" 310 alone.

Although it is conceivable to do without it, the sequence control module 5 is currently regarded as providing an important security element.

This sequence control module 5 can contain a cycle counter. This counter decrements one credit of cycles each time a chosen one of the states is entered. In the case of the three-state handler, this counts the number of times the card is withdrawn or inserted into the reader. When this credit is zero, any communication controlled by the sequence control module 5 is disabled (252).

Thus, a fraudster who might have succeeded in developing a mechanical or electrical system capable of simulating the withdrawal and insertion of the card is limited in his operations by the number of possible cycles, this being relatively restricted in the case of normal use.

In other words, the sequence control module 5 exercises at 252 a second level of interception on the communications with the other modules, here 3 and 4. This control module 5 could moreover be regarded functionally as a constituent of the security module 6.

Preferably, the dedicated unit moreover includes a software protection module 7. The latter's exchanges of data with the local processing unit 1 may escape the control of the communication security module 6, especially if this software protection module incorporates a different encryption process, which is redundant or incompatible with that of the communication security module. In a known manner, this module 7 responds to input data 201 via results 202, in accordance with a rule which depends on information contained in the card, with the desired degree of complexity.

It is advantageous (link 210) to render the module 7 active at the same time as the state II (312) generated by the sequence control module 5. In this way, the software can function only if the dedicated unit has received an engage command, thus obliging execution of the sequence in spite of any attempt at fraud. As the disengage command does not intervene during normal operation of the software, any attempt at simulation of this disengagement will lock up the functioning of the software.

The dedicated unit can also include a time metering module 4 which runs a timer when this module is active.

This time metering module 4 disables (253) communication between the central processing unit and the usage counter 3 when the timer reaches a predetermined value.

Preferably, the time metering is implemented only during the state II of the sequence 5: the timer is activated (link 212) only when the sequence control module 5 has received an engage request 309, that is to say when the software is actually being operated (and not as soon as the dedicated unit is in service).

This function is intended, in particular, to define an "expiry period" for the card, not to be confused with any possible expiry date for this card, which may be managed by the communication security module 6.

The remaining period of this time metering module 4 can be read (205) by the central processing unit, under the control of the communication security module 6, and, as the case may be, of the sequence module 5.

The time metering module 4 can, internally, read (217) or decrement (216) the usage counter 3.

The engage request 309 and disengage request 310 of the sequence control module 5 can be activated internally in the dedicated unit 2:

engagement is effected implicitly on each communication with the central processing unit, disengagement is effected if no communication has taken place for a predetermined duration.

Figure 2A:
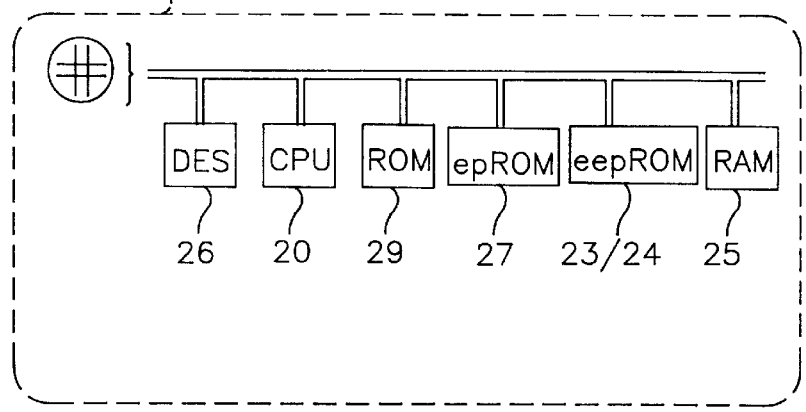

FIG. 2A illustrates an example of an applicable smart card. The lines issuing from the connector are applied to a processing unit 20, equipped with a clock (not represented), and accompanied by a program memory 29. Added thereto are the encryption element 26, which comprises the basics of the module 6, the epROM element 27, which can contain customized encryption functions, the e2pROM element $^{23}/_{24}$, which comprises the functions of the modules 3 and 4, and lastly the random-access memory element 25, which can contain the sequence control handler, while its possible counter is eepROM-based, in order to retain a memory record of the counting.

In a first particular embodiment, the smart card is of the COS type from the company GEMPLUS:

i) this card can incorporate an electronic purse function, constituting the usage counter module 3, ii) the module 6 is built on the basis of a DES type encryption algorithm, customized through a secret set, protecting in particular the module 3, iii) the DECREMENT and READ commands are of the form:
DECREMENT (Identifier, Session_key, Transaction_No., Debit_amount),
READ (Identifier, Session_key, Transaction_No.), iv) the awaited response is a certificate which will be an encrypted function of the above data, v) the modules 4 and 5 are constructed by the expanding of instructions in eepROM or epROM, what engineers term a "specific mask". In respect of the module 5, this involves constructing the handler appropriate to the sequence described; the function of the module 4 is technically similar to that of the module 3, without external decrementation order, with use of the clock of the microprocessor of the card, viii) the software protection module 7 can be constructed in any known appropriate manner, for example with the DES algorithm of the card, in order to decipher certain parts of the commands, enciphered beforehand in ECB mode.

In a second particular embodiment, in which the functions of the modules 4 and 5 are not deployed, the smart card is of the SCOT 30 type from the company BULL CP8. Implementation is as follows:

i) in respect of the module 3, at least one memory area is defined, forming a counter, ii) this module 3 will be accessible only on input of an identifier and a code, which are checked by the communication security module 6, with respect to their values stored in the card, iii) the DECREMENT and READ commands are then of the form:
DECREMENT (Identifier, Code, Debit_amount)
READ (Identifier, Code)

iv) the awaited response is:
OK (remaining_credit), or
NOTOK (Error_type)

v) the module 7 can use the DES standard algorithm of the card, to decipher certain parts of the commands, enciphered beforehand in ECB mode.

It is clear that the implementation of the invention depends to a certain extent on the technology of the card used. However, the invention remains at least partially applicable whatever this technology, provided that the card incorporates a processing unit.

This being so, the expression "operating system" is here to be interpreted in the broad sense, and extends to any set of hardware and/or software functions making it possible to run a piece of software and to access at least one peripheral.

The dedicated unit 2 can contain several groups of modules, distributed in one or more cards, each corresponding to a central processing unit, renter, lessor, piece of software or other use unit. The word software is here used in the broad sense, and is aimed at both a program as well as all files or services made available to the user.

Each of these groups is assigned arguments of the commands which are at least in part different.

The example may be taken of two companies who propose common software but who wish to remain independent of each other. The benefit may be appreciated of a card which functions with two separate groups of modules, but which locks-out the use of the software on the request of one or other of these groups.

In practice, it is possible to use a disposable card, credited only once during manufacture, or a card which can be reloaded, possibly remotely. Furthermore, the expression "dedicated unit" implies merely that this unit at least partly escapes the control of the central unit; it does not preclude the dedicated unit from being physically built into the box of this central processing unit.

From another standpoint, it is clear that the invention could also be expressed in the form of processes, and that it applies not only to smart cards, but also to any type of portable object suitable for accommodating similar capabilities, such as for example "smart keys".

What is claimed is:

1. A computerized device, comprising:
a central processing unit having a memory in to which is loaded an operating system, said central processing unit having at least one connection interface which can be accessed through a function of the operating system;
a dedicated unit including a reader of a removable memory medium, such as a card, connected to the central processing unit by the connection interface;
software, operable on said central processing unit, having specific calls, to the dedicated unit, for conditioning the conduct of the execution of said software on the state of data in the removable memory medium, the specific calls are configured in the form of communication commands, processing send arguments, and whose completion state is suspended while awaiting a response of particular form; the removable unit having a communication security module capable of disabling the response to a communication command originating from the central processing unit, depending on first conditions involving the expression of the communication command and information contained in the card, and at least one responsive module capable of recognizing the communication command and of according a favorable response, in the particular form, only if second conditions regarding the arguments of the communication command, and the information contained in the card are complied with.

2. A device according to claim 1, wherein at least some of the communication commands are interpreted by the dedicated unit as combining several functions.

3. An device according to claim 1, wherein the dedicated unit consists of several groups of responsive modules, assigned to arguments of the communication commands which are at least in part different.

4. A device according to claim 1, wherein the dedicated unit includes a smart-card reader and that the removable part is a smart card.

5. Device according to claim 1, wherein one of the responsive modules is a usage metering module.

6. A device according to claim 5, wherein one of the responsive modules is a time metering module.

7. A device according to claim 6, wherein the response of a particular form includes a first state, authorizing of normal operation of the software, and a second state, authorizing of operation in a downgraded mode.

8. A device according to claim 7, wherein the dedicated unit further comprises a sequence control module configured as a one state among N looped sequential handler, N being equal to at least two, each state being associated with a transition which conditions transfer to this state, while the second state, whose input transition is defined, directly or implicitly, by one at least of the communication commands, conditions certain operations in the card.

9. A device according to claim 8, wherein the handler comprises at least three states associated with three transitions including "withdrawal/insertion", "engagement" and "disengagement", which are respectively valid when the removable part is inserted after having been extracted, when an engage request is present, and when a disengage request is present.

10. A device according to claim 9, wherein the engage request and disengage request are made internally in said dedicated unit, engagement being effected when said dedicated unit receives a communication command, and disengagement being effected when no communication command has been received for a specified duration.

11. A device according to claim 10, wherein the sequence control module includes a counter of the number of transfers and is capable of disabling the communications with other responsive modules when a defined count is reached.

12. A device according to claim 11, wherein the dedicated unit includes a software protection module including processing means for formulating a response to an associated communication command, the response is defined on the basis of data at least partly contained in the removable medium.

13. A device according to claim 12, wherein the software protection module is active at the same time as the second state of the sequence control module.

14. A device according to claim 13, wherein the time metering module contains a time credit which can be read by said central processing unit, the time metering module is capable of decrementing a time credit depending on communication commands, as well as of disabling certain communication commands, when the time credit is zero.

15. A device according to claim 14, wherein time metering module is active at the same time as the second state of the sequence control module.

* * * * *